(12) United States Patent
Bunker

(10) Patent No.: US 10,487,664 B2
(45) Date of Patent: Nov. 26, 2019

(54) ADDITIVE MANUFACTURING METHOD FOR MAKING HOLES BOUNDED BY THIN WALLS IN TURBINE COMPONENTS

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 14/936,578

(22) Filed: Nov. 9, 2015

(65) Prior Publication Data

US 2017/0130591 A1    May 11, 2017

(51) Int. Cl.
| | |
|---|---|
| *F01D 5/18* | (2006.01) |
| *B22F 7/04* | (2006.01) |
| *B22F 5/04* | (2006.01) |
| *B22F 7/08* | (2006.01) |
| *B33Y 10/00* | (2015.01) |
| *B33Y 40/00* | (2015.01) |
| *C23C 24/08* | (2006.01) |

(Continued)

(52) U.S. Cl.
CPC ............ *F01D 5/186* (2013.01); *B22F 3/1055* (2013.01); *B22F 3/24* (2013.01); *B22F 5/04* (2013.01); *B22F 7/04* (2013.01); *B22F 7/08* (2013.01); *B23K 15/0086* (2013.01); *B23K 15/0093* (2013.01); *B23K 26/34* (2013.01); *B23K 26/384* (2015.10); *B23K 26/389* (2015.10); *B33Y 10/00* (2014.12); *B33Y 40/00* (2014.12); *C23C 24/087* (2013.01); *F01D 25/285* (2013.01); *B22F 2998/10* (2013.01); *B22F 2999/00* (2013.01); *B23K 2101/001* (2018.08); *B23K 2103/26* (2018.08); *B23P 2700/06* (2013.01); *F05D 2230/10* (2013.01); *F05D 2230/31* (2013.01); *Y02P 10/295* (2015.11); *Y02T 50/676* (2013.01)

(58) Field of Classification Search
CPC ........ F01D 5/186; B23P 2700/06; B22F 5/04; B22F 7/04; B22F 7/08
See application file for complete search history.

(56) References Cited

U.S. PATENT DOCUMENTS

| | | | |
|---|---|---|---|
| 4,043,883 | A | 8/1977 | Puhr-Westerheide |
| 4,156,807 | A | 5/1979 | Howard et al. |

(Continued)

FOREIGN PATENT DOCUMENTS

| | | |
|---|---|---|
| CN | 102695602 A | 9/2012 |
| DE | 19536312 C1 | 5/1996 |

(Continued)

OTHER PUBLICATIONS

European Search Report and Opinion issued in connection with corresponding EP Application No. 6197932.3 dated Mar. 17, 2017.

(Continued)

*Primary Examiner* — Xiao S Zhao
(74) *Attorney, Agent, or Firm* — General Electric; Kristi Davidson

(57) ABSTRACT

A method of forming a passage in a turbine component that includes using an additive manufacturing process to form a first support structure on a first surface of the turbine component; and forming a passage through the first support structure and the turbine component.

12 Claims, 8 Drawing Sheets

(51) Int. Cl.
*B22F 3/105* (2006.01)
*B22F 3/24* (2006.01)
*F01D 25/28* (2006.01)
*B23K 15/00* (2006.01)
*B23K 26/34* (2014.01)
*B23K 26/382* (2014.01)
*B23K 26/384* (2014.01)
*B23K 101/00* (2006.01)
*B23K 103/18* (2006.01)

(56) References Cited

U.S. PATENT DOCUMENTS

| | | | |
|---|---|---|---|
| 4,239,954 | A | 12/1980 | Howard et al. |
| 5,997,251 | A | 12/1999 | Lee |
| 8,632,311 | B2 | 1/2014 | Klasing et al. |
| 2010/0078418 | A1 | 4/2010 | Lei et al. |
| 2012/0164376 | A1 | 6/2012 | Bunker et al. |
| 2013/0195673 | A1 | 8/2013 | Godfrey et al. |
| 2013/0280091 | A1 | 10/2013 | Propheter-Hinckley et al. |
| 2014/0048515 | A1 | 2/2014 | Oliver Vargas |
| 2014/0079540 | A1 | 3/2014 | Morris et al. |
| 2014/0169981 | A1* | 6/2014 | Bales ............ B22F 5/04 416/96 R |
| 2014/0216042 | A1 | 8/2014 | Hanson |
| 2016/0332251 | A1 | 11/2016 | Bunker et al. |

FOREIGN PATENT DOCUMENTS

| | | |
|---|---|---|
| EP | 2685170 | 1/2014 |
| EP | 2 851 146 A1 | 3/2015 |
| WO | 2013163037 | 10/2013 |
| WO | 2014150490 | 9/2014 |

OTHER PUBLICATIONS

Extended European Search Report and Opinion issued in connection with corresponding EP Application No. 16197932.3 dated Jul. 17, 2017.

Office Action issued in connection with corresponding EP Application No. 16197932.3 dated Nov. 19, 2018.

Unofficial English Translation of Chinese Office Action issued in connection with corresponding CN Application No. 201610984686.1 dated Jun. 4, 2018.

* cited by examiner

US 10,487,664 B2

ADDITIVE MANUFACTURING METHOD FOR MAKING HOLES BOUNDED BY THIN WALLS IN TURBINE COMPONENTS

BACKGROUND OF THE INVENTION

The present invention relates to hole formation in turbine components and more specifically to the formation of holes bounded by thin walls using an additive manufacturing process.

Airfoils in a turbine engine often include cooling holes for discharging air through aircraft components that have very thin walls. Such aircraft components can include one or both sides of the wall section, a flange, or other component requiring a through hole such as: a film hole, an impinging hole, a floor orifice, etc. One example of such a component is the trailing edge of an airfoil having a cooling hole formed therethrough.

Conventional methods for forming cooling holes through aircraft components include casting and machining. Components prepared by either of these methods have limitations regarding the shape of walls they can be manufactured such as the minimum angles of corners and the minimum thickness, i.e., thinness, of walls that can be manufactured.

BRIEF DESCRIPTION OF THE INVENTION

This need is addressed by a method of providing support for formation of very thin walls that bound cooling holes using an additive manufacturing process.

According to one aspect of the present invention there is provided a method of forming a passage in a turbine component. The method includes using an additive manufacturing process to form a first support structure on a first surface of the turbine component; and forming a passage through the first support structure and the turbine component.

According to another aspect of the present invention there is provided a method of forming a passage in a turbine component. The method includes: using an additive manufacturing process to form a first support structure on a first surface of the turbine component; and forming a passage near the first support structure in the turbine component.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
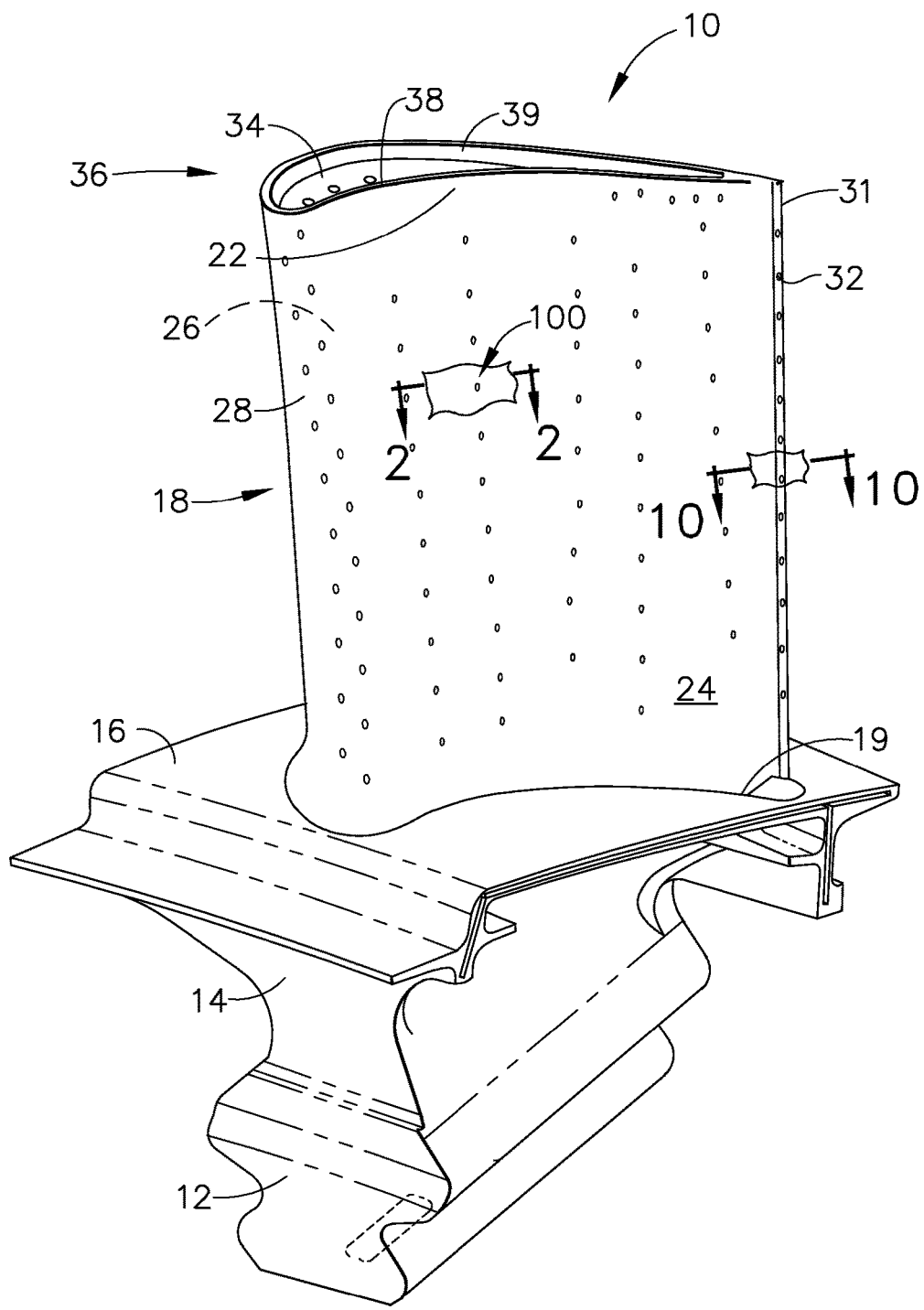
FIG. 1 is a perspective view of a turbine blade for inclusion in an aircraft engine wherein a wall of the turbine blade includes multiple film holes for cooling the wall.

Referring to the drawings wherein identical reference numerals denote the same elements throughout the various views, FIG. 1 illustrates an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil has a root 19 at the junction of the platform 16 and the airfoil 18, and a tip 22 at its radially outer end. The airfoil 18 has a concave pressure side wall 24 and a convex suction side wall 26 joined together at a leading edge 28 and at a trailing edge 31.

The airfoil 18 may take any configuration suitable for extracting energy from the hot gas stream and causing rotation of the rotor disk. The airfoil 18 incorporates a plurality of trailing edge cooling holes. The tip 22 of the airfoil 18 is closed off by a tip cap 34 which may be integral to the airfoil 18 or separately formed and attached to the airfoil 18. An upstanding squealer tip 36 extends radially outwardly from the tip cap 34 and is disposed in close proximity to a stationary shroud (not shown) in the assembled engine, in order to minimize airflow losses past the tip 22. The squealer tip 36 comprises a suction side tip wall 38 disposed in a spaced-apart relationship to a pressure side tip wall 39. The tip walls 39 and 38 are integral to the airfoil 18 and form extensions of the pressure and suction side walls 24 and 26, respectively. The outer surfaces of the pressure and suction side tip walls 38 and 39 respectively form continuous surfaces with the outer surfaces of the pressure and suction side walls 24 and 26. A plurality of film cooling holes 100 pass through the exterior walls of the airfoil 18. The film cooling holes 100 communicate with an interior (not shown) of the airfoil 18, which may include a complex arrangement of cooling passageways defined by internal walls, such as a serpentine configuration. It should be appreciated that airfoil 18 may be made from a material such as a nickel- or cobalt-based alloy having good high-temperature creep resistance, known conventionally as "superalloys."

Figure 2:
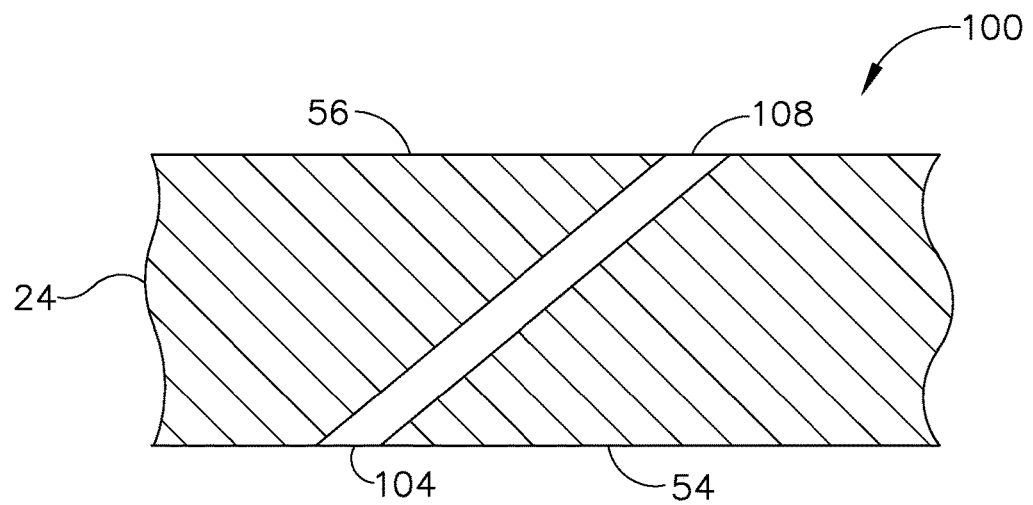
FIG. 2 is a cross-sectional view of a portion of the turbine blade shown in FIG. 1 taken at line 2-2 showing a film hole formed in accordance with a method for manufacturing the film hole by additive manufacturing.

FIG. 2 illustrates one of the film cooling holes 100 in more detail. The film hole 100 extends from an interior surface 54 of the pressure side wall 24 to an outer surface 56 of the pressure side wall 24. The film hole 100 includes an entry section 104 and an exit section 108.

Figure 7:
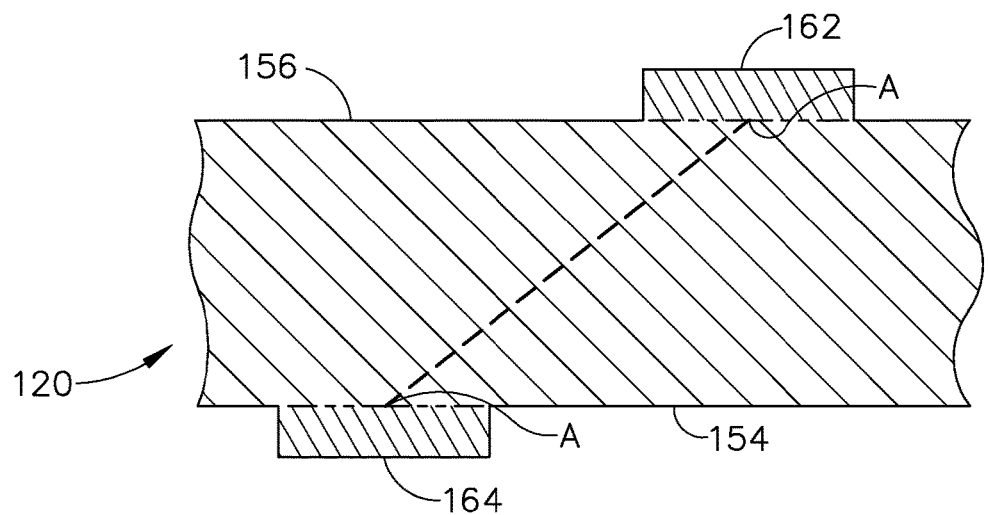
FIG. 7 is a cross-sectional view of a portion of the wall section of FIG. 6, showing support structures that have been added to the wall section of FIG. 6.

A method of manufacturing a film hole such as the film hole 100 will now be described. The method will include steps of adding a pair of reinforcing blocks 162 and 164 (as can be seen in FIG. 7) via additive manufacturing. As will be better understood from the description of the latter stages of the process, the purpose of the reinforcing blocks 162 and 164 is to provide support during machining such that precise edges at the entry 104 and the exit 108 can be formed. The method also includes a step of removing at least a portion of the one reinforcing blocks 162 and 164.

Figure 3:
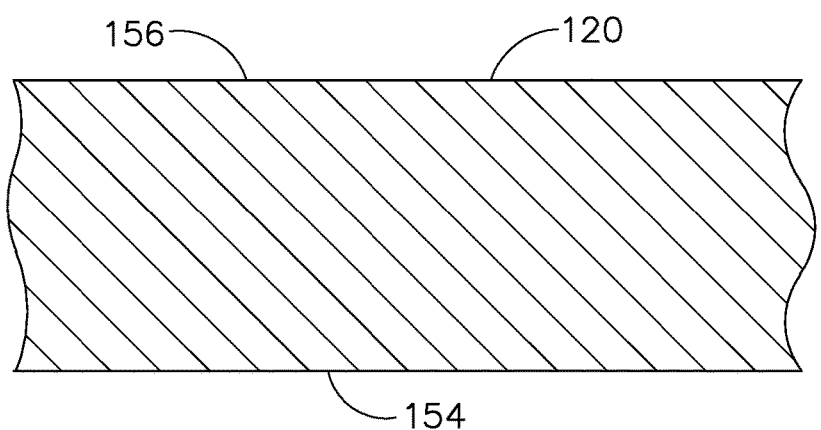
FIG. 3 is a cross-sectional view of a portion of a wall section blank generated during one step of the manufacturing process of the turbine blade of FIG. 1 taken along line 2-2 in FIG. 1.
Figure 4:
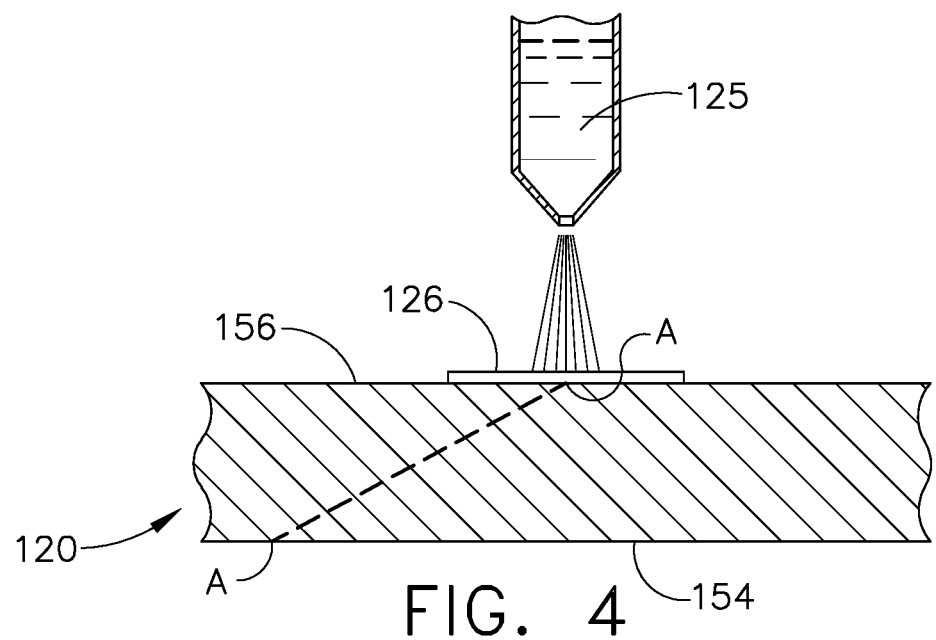
FIG. 4 is a cross-sectional view of a portion of the wall section of FIG. 3, showing adhesive being applied to the wall section.

The process begins with providing a wall section 120 as shown in FIG. 3. The wall section 120 is generally representative of the wall section of any turbine component, of any shape such as flat, convex, concave, and/or complexly curved. Such as the suction side wall 26 described above, and includes opposed inner and outer surfaces 154 and 156 respectively. It should be understood that the providing step of the wall section 120 includes but is not limited to manufacturing of the wall section 120 or obtaining a pre-manufactured wall section 120. Methods of manufacturing the wall section 120 include but are not limited to those conventionally known such as casting, machining, and a combination thereof The line A-A through the wall section 120 generally indicates the desired path of a 122 between the inner surface 154 and the outer surface 156.

The step of forming a support structure can be understood by the following description. The steps of forming the support structure can then repeated as appropriate on any surface of the wall section 120. An adhesive 125 is applied to a predetermined area near an endpoint of line A-A on the outer surface 156. In the illustrated embodiment an adhesive patch 126 is formed such that it overlaps an endpoint of line A-A on the outer surface 156.

As used herein, the term "adhere" refers to any method that causes a layer to adhere to the surface with sufficient bond strength so as to remain in place during a subsequent powder fusion process. "Adhering" implies that the powder has a bond or connection beyond simply resting in place under its own weight, as would be the case with a conventional powder-bed machine. For example, the surface may be coated with an adhesive product, which may be applied by methods such as dipping or spraying. One non-limiting example of a suitable low-cost adhesive is Repositionable 75 Spray Adhesive available from 3M Company, St. Paul, Minn. 55144 US. Alternatively, powder could be adhered by other methods such as electrostatic attraction to the part surface, or by magnetizing the powder (if the part is ferrous). As used herein, the term "layer" refers to an incremental addition of mass and does not require that the layer be planar, or cover a specific area or have a specific thickness.

Figure 5:
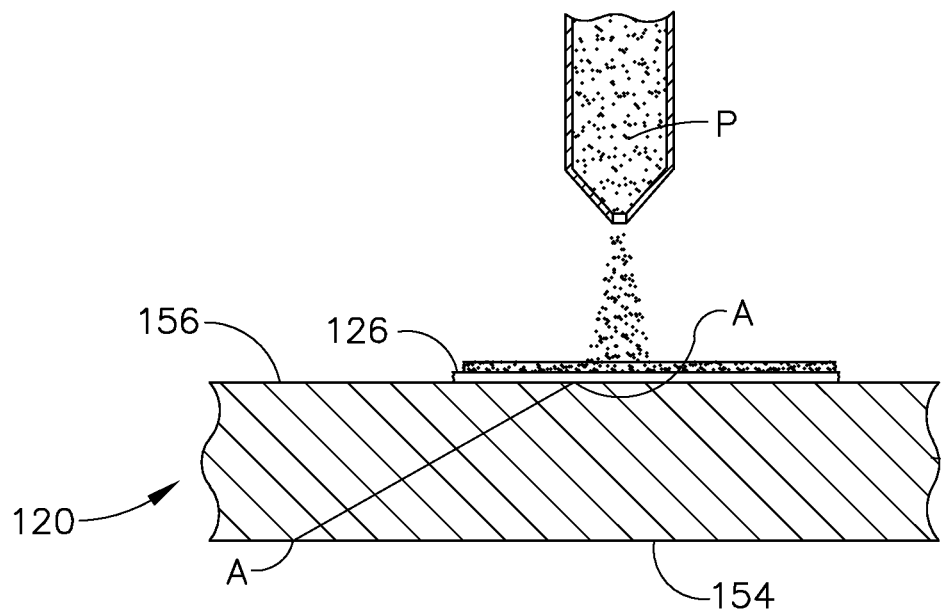
FIG. 5 is a cross-sectional view of a portion of the wall section of FIG. 4, showing powder being applied to the wall section.

As shown in FIG. 5, a layer of powder P for example, metallic, ceramic, and/or organic powder is deposited onto the adhesive patch 126 which is positioned on the outer surface 156. As a non-limiting example, the thickness of the powder layer may be about 10 micrometers (0.0004 in.).

The powder P may be applied by dropping or spraying the powder over the outer surface 156, or by dipping the wall section 120 in powder. Powder application may optionally be followed by brushing, scraping, blowing, or shaking as required to remove excess powder, for example to obtain a uniform layer. It is noted that the powder application process does not require a conventional powder bed or planar work surface, and the part may be supported by any desired means, such as a simple worktable, clamp, or fixture. It should be appreciated that the powder P may be applied directly to the outer surface 156 and that the application of the adhesive 125 and formation of the patch 126 is optional.

Figure 6:
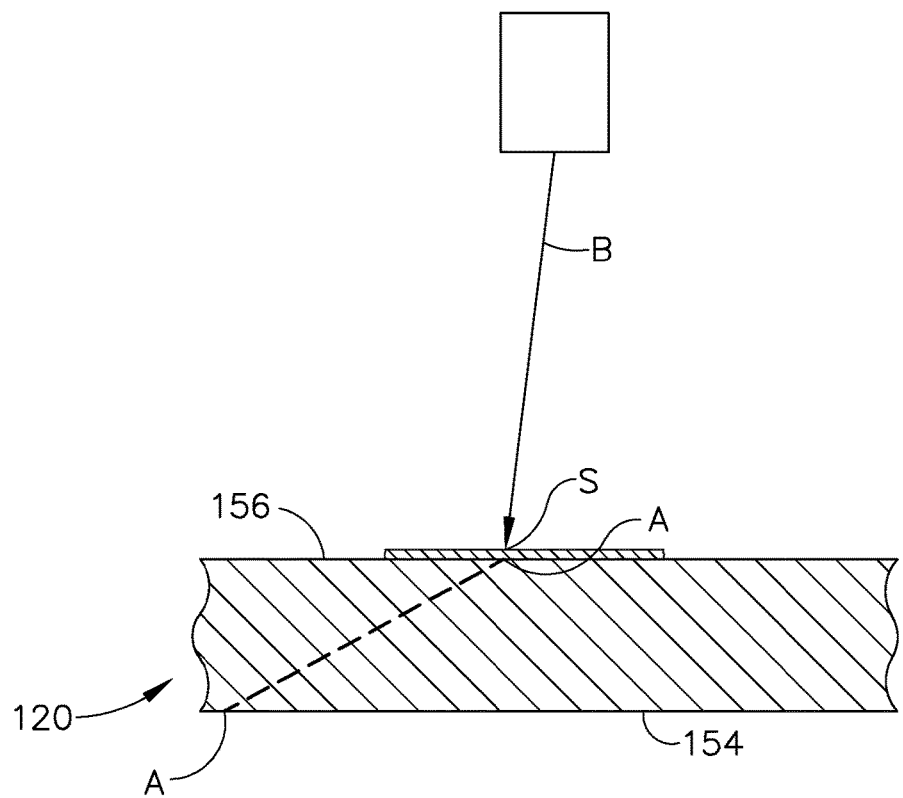
FIG. 6 is a cross-sectional view of a portion of the wall section of FIG. 5, showing powder being fused.

As can be seen in FIG. 6, once the powder P is deposited over at least a portion of the outer surface 156 of the wall section 120, a directed energy source B (such as a laser or electron beam) is used to melt a layer of the support structure being built. The directed energy source emits a beam and a beam steering apparatus is used to steer the beam over the exposed powder surface in an appropriate pattern. The exposed layer of the powder is heated by the beam to a temperature allowing it to melt, flow, and consolidate and fuse to or adhere to substrate with which it is in contact. In this manner, the metallic particles that made up powder P now exist as part of the wall section 120. This step may be referred to as fusing the powder. Unfused powder can be removed at this stage prior to the next cycle of applying an adhesive, applying powder, and fusing the powder. However, in the illustrated embodiment, unfused powder that is not removed in each step remains in place. In this regard the unfused powder can operate to support powder of the next layer.

This cycle of depositing powder and then directed energy melting the powder is repeated until a first reinforcing block 162 is complete as shown in FIG. 7. According to the illustrated embodiment, the steps of forming a reinforcing block are repeated such that a second reinforcing block 164 is formed on the inner surface 154 such that it overlaps the end of line A-A positioned at the inner surface 154. It should be appreciated that while the first reinforcing block 162 and the second reinforcing block 164 are shown as having generally rectangular cross-sections, they can be substantially any shape that provides appropriate reinforcing and support. After both the first reinforcing block 162 and the second reinforcing block 164 are formed such that they overlap the respective ends of line A-A, a bore 122 is formed such that it extends through the first reinforcing block 162, wall section 120 along line A-A, and through the second reinforcing block 164.

Figure 8:
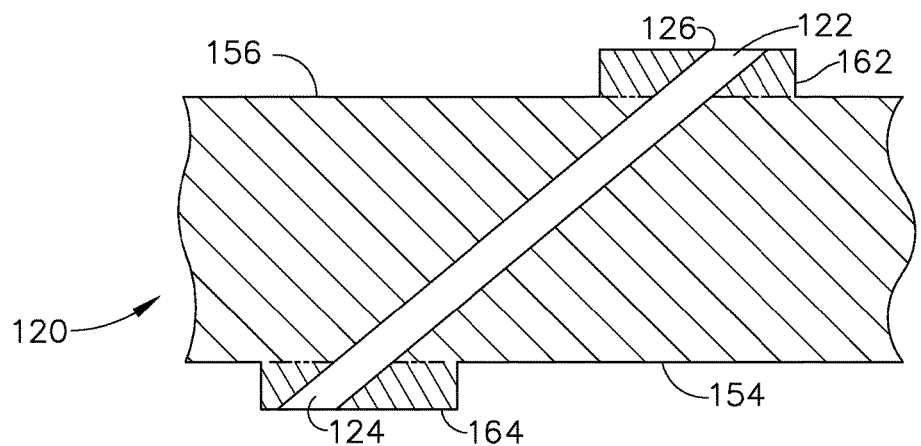
FIG. 8 is a cross-sectional view of the wall section of FIG. 4, showing a bore formed therethrough.

As can be seen in FIG. 8, the bore 122 has a first end 124 and a second end 126. The bore 122 also has generally straight sides as it passes through the first reinforcing block 162 and a second reinforcing block 164 into an out of the wall section 120. In this regards, the reinforcing blocks 162 and 164 operate to brace and support the wall section 120 such that very precise angles can be defined by the bore 122 and the respective wall surfaces 154 and 156 as the bore 122 passes through the wall section 120. It should be appreciated that according to other aspects of the described method, the bore 122 can following non-straight path and can have a cross-sectional shape other than round.

Figure 9:
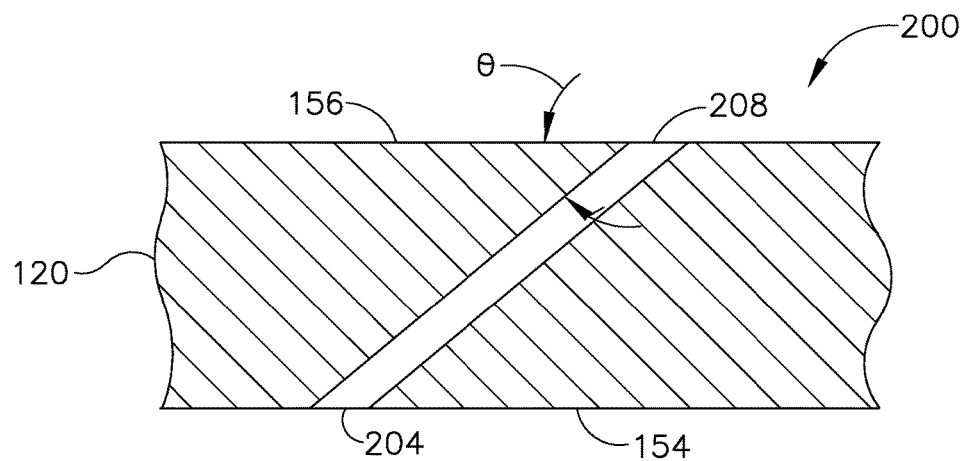
FIG. 9 is a cross-sectional view similar to FIG. 8 showing the reinforcing blocks removed.

After the bore 122 is formed as shown in FIG. 8, the first reinforcing block 162 and the second reinforcing block 164 can be removed using conventional machining methods. Referring now to FIG. 9, after the first reinforcing block 162 and the second reinforcing block 164 are removed from the wall section 120 a film hole 200 remains. Film hole 200 includes an entry section 204 and an exit section 208. A feature of the method described herein is that the edges of the entry section 204 and the exit session 208 are clearly defined. In addition, the current method allows the fabrication of an acute angle such as angle Θ shown near exit 208. In accordance with the method described, reinforcing blocks are configured to allow forming of holes by methods such as drilling or with a laser such that angle Θ is less than 20°.

Alternatively, finishing and cleaning steps can be performed such that the inner surface 154 and the outer surface 156 after the desired finishes and debris such as powder and adhesive particles are removed. It should be appreciated that according to some embodiments, some of the new material added in the formation of the first reinforcing block and/or the second reinforcing block 164 can be left as part of the finished component.

Referring now to another exemplar for use of the above described a method for manufacturing aircraft components utilizing additively manufactured reinforcing blocks, FIGS. 10-14 show different stages of the formation of a cooling hole 400 through a trailing edge 426. It is believed that, the cooling hole 400 made as described below can have a wall thicknesses at a tip 428 that is thinner than can be formed by conventional methods.

Figure 10:
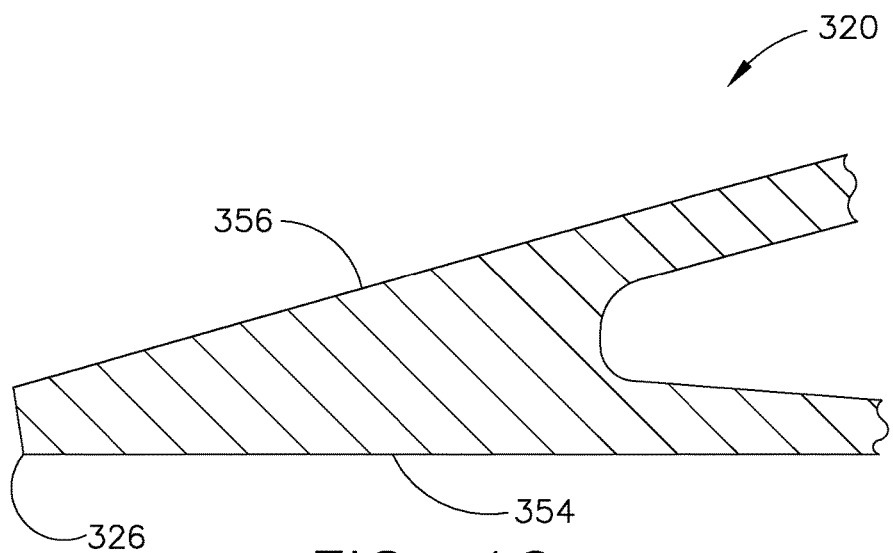
FIG. 10 is a cross-sectional view of a portion of a trailing edge section blank generated during one step of the manufacturing process of the turbine blade of FIG. 1 taken along line 10-10 in FIG. 1.

The process begins with providing a trailing edge section 320 as shown in FIG. 10. The wall section 320 is generally representative of the trailing edge section of any compressor or turbine airfoil, such as the trailing edge 31 described above, and includes opposed pressure side and suction side surfaces 354 and 356 respectively and a tip 328. It should be understood that the providing step of the trailing edge section 320 includes but is not limited to manufacturing of the trailing edge section 320 or obtaining a pre-manufactured trailing edge section 320. Methods of manufacturing the trailing edge section 320 include but are not limited to those conventionally known such as casting, machining, and a combination thereof.

The step of forming a first reinforcing block 362 near tip 328 such that tip 328 is reinforced for machining of a bore therethrough can be understood by the following description. The step of forming a first reinforcing block 362 can then repeated as appropriate on any surface. According to the illustrated embodiment, the first reinforcing block 362 is positioned near the tip 328 and generally opposite a second reinforcing block 364 which is also positioned near the tip 328. The formation of the first reinforcing block 362 and the second reinforcing block 364 can be understood from the description of the formation of a first reinforcing block 162 described above.

Figure 11:
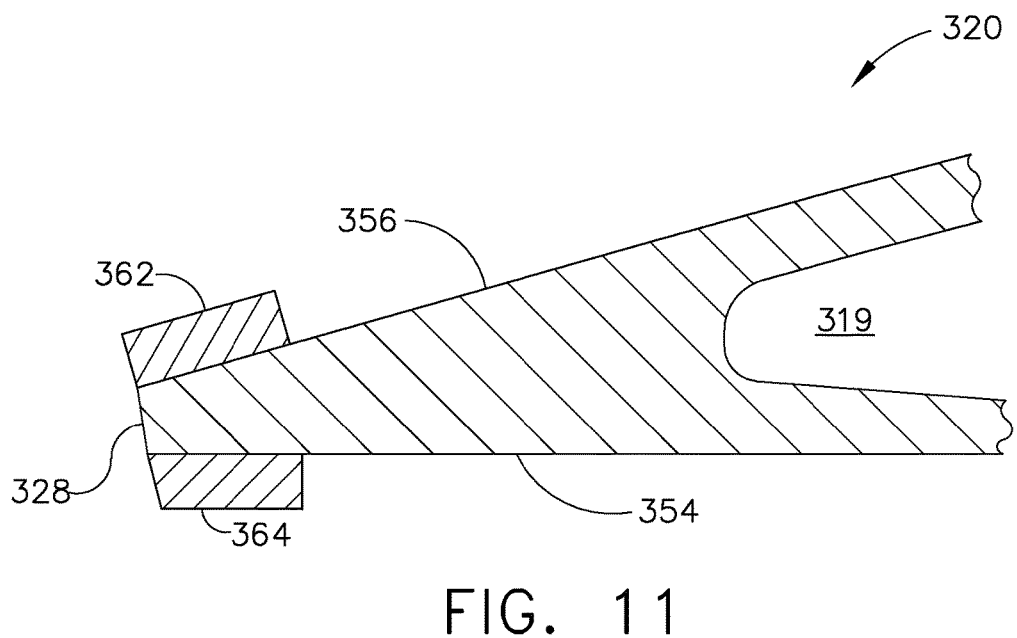
FIG. 11 is a cross-sectional view of a portion of the trailing edge section of FIG. 10, showing support structures that have been added to the wall section of FIG. 10.

After both the first reinforcing block 362 and the second reinforcing block 364 are formed, a bore 322 is formed such that it extends through the trailing edge section 320 from the tip 328 between the first reinforcing block 362 and second reinforcing block 364 to an interior section 319. The bore 322 can be seen in FIG. 12. As can be seen in FIG. 11, bore 322 has a first end 324 and a second end 326.

After the bore 322 is formed as shown in FIG. 8, the first reinforcing block 362 and the second reinforcing block 364 can be removed using conventional machining methods. It should be appreciated that removal of the first reinforcing block 362 and the second reinforcing block 364 can be partial or complete, and it can include removal of the adjacent surface of the trailing edge 320.

Figure 12:
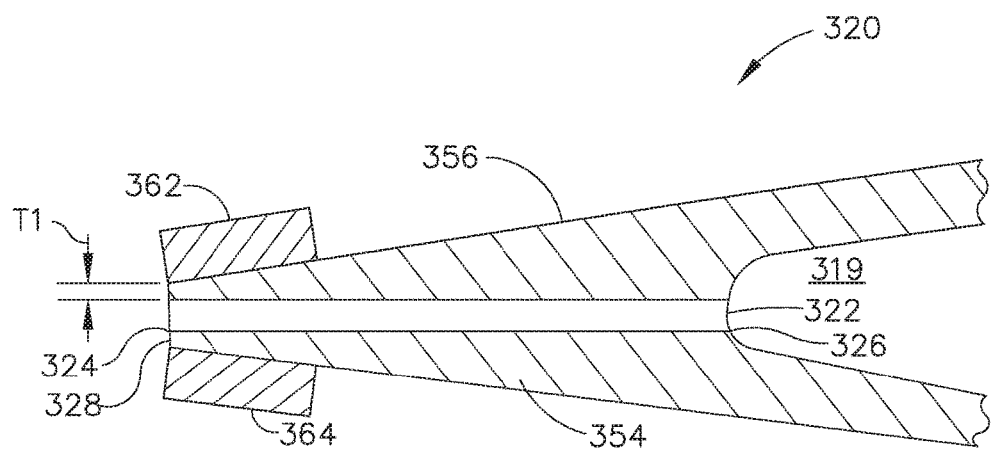
FIG. 12 is a cross-sectional view of a trailing edge section of FIG. 11, showing a bore formed therethrough.
Figure 13:
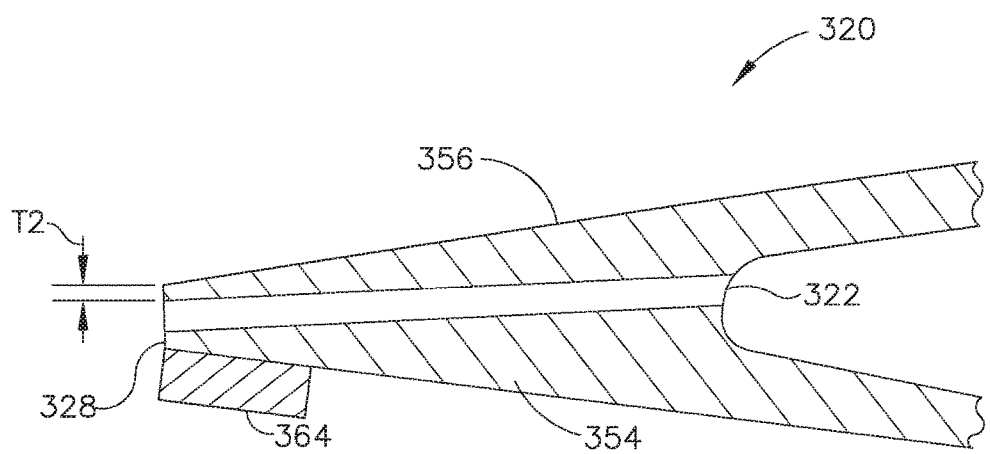
FIG. 13 is a cross-sectional view of a portion of the trailing edge section of FIG. 12.

As shown in FIG. 12, bore 322 is offset such that the first end 324 is closer to the pressure side surface 354 than it is the suction side surface 356. Thus a thickness T1 is defined between the bore 322 and the suction side surface 356 near the first end 324. The first reinforcing block 362 is removed as shown in FIG. 13. Because the second reinforcing block 364 is positioned to reinforce the tip 328, additional material from the suction side surface 356 can be removed. In this manner, a thickness T2 is defined between the bore 322 and the surface 356. The thickness T2 is thinner thickness T1. The thickness T2 can be chosen such that it is substantially similar to the thickness defined by bore 322 and the pressure side surface 354. The reinforcing block 364 is then removed.

Figure 14:
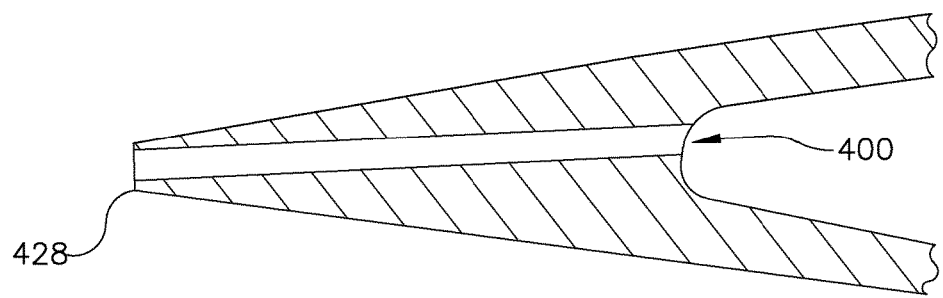
FIG. 14 is a cross-sectional view of a portion of the trailing edge section of FIG. 12, showing a trailing edge manufactured in accordance with the method described herein.

As shown in FIG. 14, the resulting cooling hole 400 extends through the trailing edge 426 to a tip 428 where the cooling hole 400 is defined by very thin walls. It is believed that the wall thicknesses achieved at the trailing edge cooling holes by the method described above can be thinner than those possible with conventional manufacturing methods. It should be appreciated that generally, wall shapes achieved by the method described above can be dimensioned as desired such that they are symmetrical, asymmetrical, various shapes, or of such thickness or configuration that they could be manufactured by conventional methods.

The process described is merely one example of an additive manufacturing process. "Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

The process described herein has several advantages over the prior art. The additive manufacturing process is far more flexible as to shape, general configuration, and precision with which thin walls and acute angles of cooling holes and film holes that can be manufactured. In addition, it is believed that the additive manufacturing process allows lower heat generation during formation of film holes and thus less deformation of crystalline structure and exit block shape and configuration.

The method described above provides a means for creating cooling holes with at least one of the following: a clearly defined edge, an acute angle, a thin wall and a combination thereof. It is believed that these capabilities will permit both flexibility and cost reductions in making complex cooled components. This in turn has the potential of increasing cooling efficiency of turbine components and lowering engine specific fuel consumption ("SFC").

The foregoing has described an apparatus and method for additive manufacturing of precisely defined cooling holes in aircraft components. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method of forming a passage in a turbine component comprising:
   using an additive manufacturing process to form a first support structure on a first surface of the turbine component, wherein the additive manufacturing process includes depositing powder on the first surface of the turbine component, and fusing the powder in a pattern corresponding to a layer of the first support structure;
   forming a passage through the first support structure and the turbine component; and
   completely removing the first support structure after forming the passage.

2. The method of claim 1, further comprising repeating in a cycle the steps of depositing and fusing to build up the first support structure in a layer-by-layer fashion.

3. The method of claim 1, further comprising removing at least a portion of the first surface of the turbine component.

4. The method of claim 1 further comprising forming a second support structure on a second surface of the turbine component.

5. The method of claim 4 further comprising forming the passage through both the first support structure and the second support structure.

6. The method of claim 5, further comprising removing at least a portion of the second support structure after forming the passage.

7. The method of claim 1, wherein the component comprises a metal alloy.

8. The method of claim 1, wherein the powder comprises a metal alloy.

9. a method of forming a passage in a turbine component comprising:
   using an additive manufacturing process to form a first support structure on a first surface of the turbine component;
   forming a second support structure on a second surface of the turbine component;
   forming a passage through the first support structure, the turbine component, and the second support structure; and
   completely removing the first support structure and the second support structure after forming the passage.

10. A method of forming a cooling hole in a turbine component comprising:
    using an additive manufacturing process to form a first support structure on a first surface of the turbine component;
    forming a second support structure on a second surface of the turbine component;
    forming a cooling hole through the first support structure, the turbine component, and the second support structure; and
    completely removing the first support structure and the second support structure after forming the cooling hole.

11. The method of claim 10, wherein the turbine component is a turbine blade.

12. The method of claim 11, wherein the cooling hole is formed at a trailing edge of the turbine blade.

* * * * *